Nov. 25, 1969    L. C. GOODRIDGE    3,480,344
CONCEALED FRONT FASTENER FOR ELECTRICAL
POWER DISTRIBUTION PANELBOARDS
Filed June 24, 1968                2 Sheets-Sheet 1

INVENTOR
LAWRENCE C. GOODRIDGE
BY Robert H. Casey
ATTORNEY

INVENTOR
LAWRENCE C. GOODRIDGE
BY Robert A. Cassey
ATTORNEY

United States Patent Office 3,480,344
Patented Nov. 25, 1969

3,480,344
CONCEALED FRONT FASTENER FOR ELECTRICAL POWER DISTRIBUTION PANELBOARDS
Lawrence C. Goodridge, Bristol, Conn., assignor to General Electric Company, a corporation of New York
Filed June 24, 1968, Ser. No. 739,250
Int. Cl. A47b *67/02;* H02g *3/08*
U.S. Cl. 312—242      7 Claims

ABSTRACT OF THE DISCLOSURE

A concealed front cover or "trim" fastener for electrical panelboards, comprising a clamping arm pivotally supported on a bracket carried by the inner surface of the front cover adjacent a door opening therein, and an operating member pivotally supported on the inner surface of the front cover for operating the clamping member to clamping position against a flange of the panelboard enclosure, the operating member being accessible only through the door opening in the front cover.

BACKGROUND OF THE INVENTION

Field of the invention

My invention relates to electrical power distribution panelboards, and more particularly to an improvement in electrical circuit breaker panelboards of the type comprising a box for housing the electrical components, the box often being mounted in an opening in a supporting surface, and a box front cover or "trim" detachably fastened to the open front of the box.

Description of the prior art

Through the years as shown by the prior art, many improvements have been made in the means utilized for the purpose of attaching the front to the panelboard box. The spur behind most of these improvements has been the desire either to make the task of installing the front easier, or else to improve the secureness with which the front is attached to the box.

Very little, however, has been done in an effort to obviate the potential safety hazard related to the fact that the means employed in most installations to attach the front to the box is readily accessible from the exterior. As a consequence, even though the door provided in the front for the purpose of gaining access to the interior of the panelboard may be locked, there is nothing to prevent someone from removing the front from the box by loosening the front attaching means, and thereby gaining access to the electrical equipment housed therewithin. The fact that the front may be so removed is particularly undersirable with respect to electrical panelboards installed in schools and prisons.

For these reasons, front fasteners have been developed which are not accessible when the door in the front is closed. One form of such a "concealed" front fastener or clamp is illustrated and described in copending patent application, Docket No. 41D-197, W. D. Pierson, Jr. filed concurrently herewith and assigned to the same assignee as the present invention.

OBJECTS OF THE INVENTION

It is an object of the present invention to provide an improved concealed front fastener for electrical panelboards for use in attaching a front to a panelboard box whereby the front is attached to the box so that the front cannot be removed when the door in the front is closed.

It is another object of the present invention to provide such a concealed front fastener for electrical panelboards wherein all the component parts thereof are hidden from view when the door in the front is closed and essentially all the aforesaid parts except for the operating shaft are hidden from view when the door in the front is open.

A still further object of the present invention is to provide such a concealed front fastener for electrical panelboards which simplifies the task of attaching the front to the panelboard box while yet ensuring a secure connection between the front and the box.

Yet another object of the present invention is to provide such a concealed front fastener for electrical panelboards wherein the use thereof automatically provides alignment between the front and the panelboard box, and also provides adjustment for a substantial amount of misalignment between the box and the side wall portions of the opening in the wall in which the box is supported.

SUMMARY OF THE INVENTION

In accordance with the present invention there is provided an electrical panelboard including a box having a back wall and side walls, and a separate detachably mounted front closure or trim having a door therein. A pair of means for clamping the front to respective flanges of the box side walls is provided. Each of the clamping means comprises first and second lever arms which pivot about first and second pivot pins mounted on a first surface of a carriage. The carriage is an angle member whose second surface is attached to an underside of the front. Also mounted on the carriage between the first and second pivot pins are first and second rotatable discs or gears which are attached by means of third and fourth pivot pins to the first and second lever arms at one end thereof. A predetermined amount of rotation of the disc or gears by a suitable tool causes the lever arms to pivot about their pivot pins to cause the second ends of the lever arms to engage the box side wall flanges, thereby clamping the front to the box. All of the elements of the clamping means, including the actuating means, are concealed from view when the door in the front is closed.

The invention will be more fully understood from the following detailed description and its scope will be pointed out in the appended claims.

DESCRIPTION OF A PREFERRED EMBODIMENT

Figure 1:
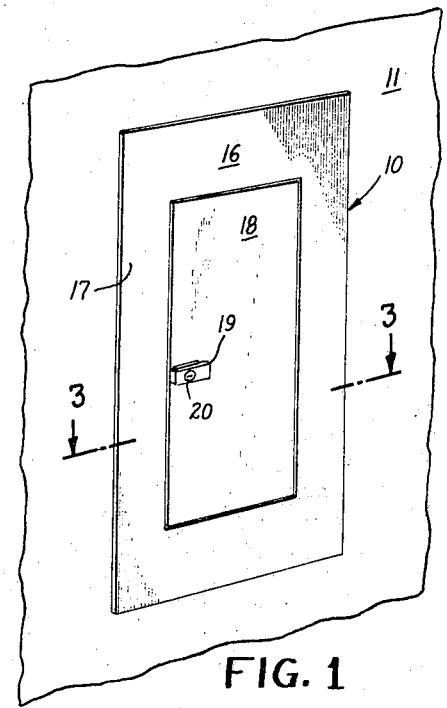
FIGURE 1 is a perspective view of an electrical panelboard mounted in an opening provided therefor in a suitable supporting surface, and having concealed front fasteners in accordance with the present invention, the latter being illustrated in skeleton.
Figure 2:
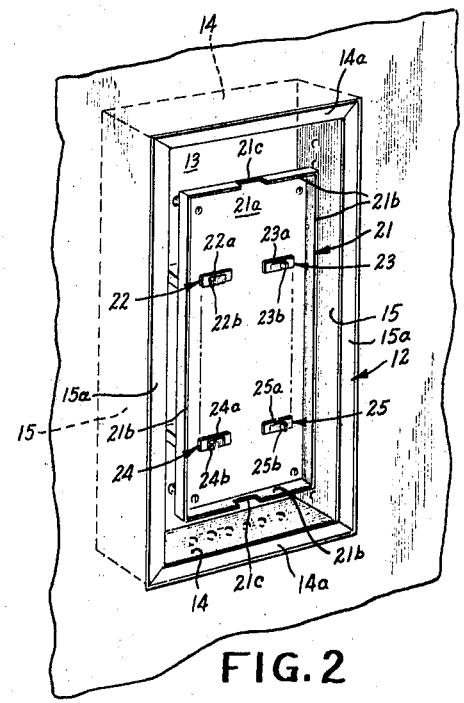
FIGURE 2 is a perspective view of the panelboard of FIGURE 1 with the front removed.

Referring to FIGURES 1 and 2 of the drawings the invention is shown as incorporated in an electrical circuit breaker panelboard enclosure 10 which is illustrated as being mounted in an opening provided therefor in a wall 11. The panelboard enclosure 10 includes a housing or box 12 comprised of a back wall 13, pairs of opposed side walls 14 and 15, respectively, and a front closure means 16 comprising a front or trim 17 having an openable door 18. Each of the opposed side walls 14 and 15 has a flange portion 14a and 15a, respectively, which projects inwardly adjacent the open side of the box 12. The door 18 is openable by means of a conventional handle 19 which preferably includes a key-operated locking means 20 whereby the door 18 may be locked when in the closed position.

Supported within the interior of the box 12 is a tray-shaped member or shield 21 which has a base portion 21a and upstanding flange portions 21b. The base portion 21a is provided in a manner well known in the art with openings or knockouts (not shown) adapted to receive raised portions 22a, 23a, 24a, and 25a of the circuit breakers 22, 23, 24, and 25, respectively, so as to render the respective circuit breaker operating handles 22b, 23b, 24b, and 25b accessible for manual operation when the door 18 of the front 17 is opened. The shield 21 may be supported within the box 12 in any suitable manner such as for example on brackets (not shown) in the manner more fully described and illustrated in Patent 2,946,928, which is assigned to the same assignee as the present invention.

Figure 5:
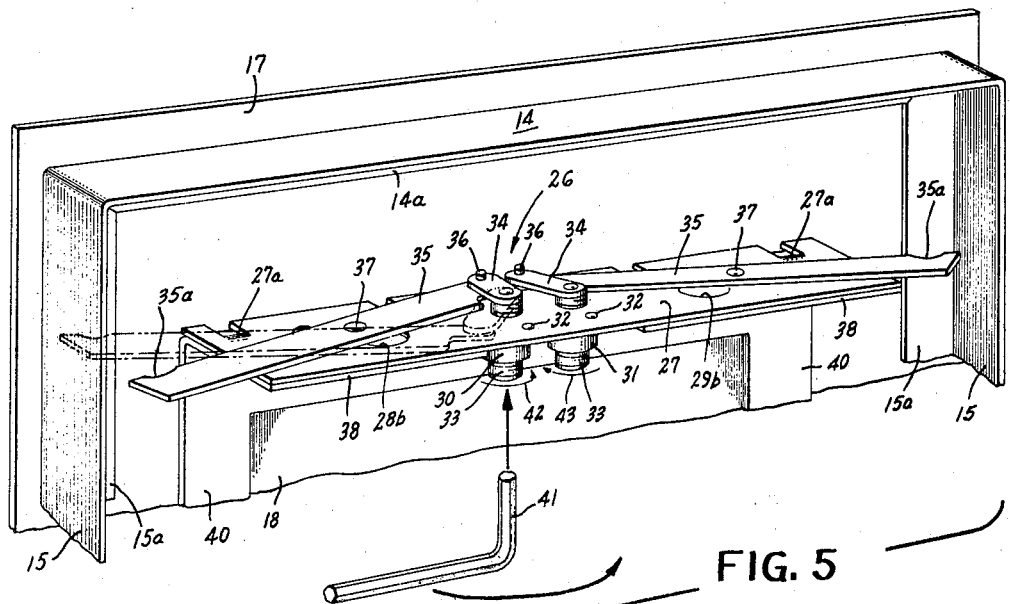
FIGURE 5 is a perspective view of a portion of an electrical panelboard viewed from the rear, and illustrating a pair of concealed front fasteners in accordance with present invention.
Figure 6:
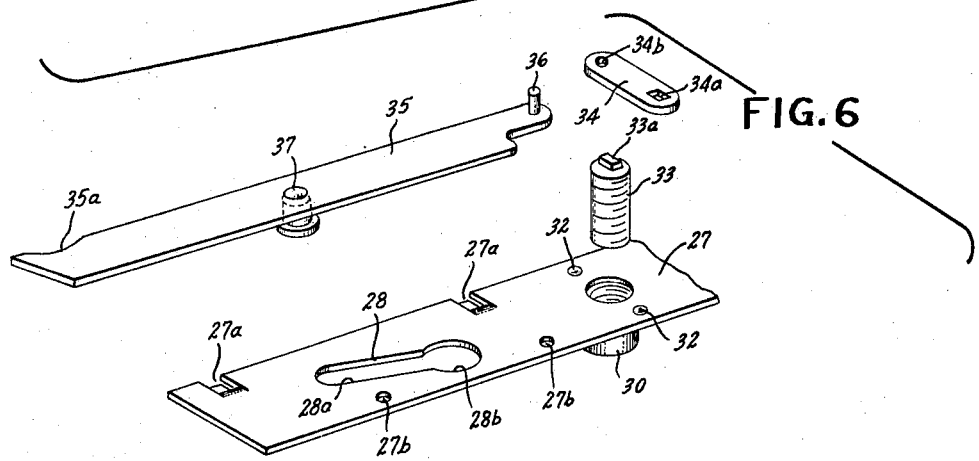
FIGURE 6 is an exploded perspective view of a concealed front fastener in accordance with the present invention.

Referring now to FIGURES 5 and 6 of the drawings, the concealed trim fastener 26 illustrated therein includes an elongated support member 27 having a pair of spaced substantially longitudinally extending slots 28 and 29 formed therein. Each of the slots 28 and 29 includes a relatively narrow portion 28a and 29a, respectively, and a relatively enlarged portion 28b and 29b, respectively, for a purpose to be described. In addition, centrally located in the support member 27 in slightly spaced relation are a pair of threaded bushings 30 and 31, the latter being mounted in fixed relation on the support member 27 by suitable means such as for example by means of a plurality of studs 32.

Supported in threaded engagement in each of the bushings 30 and 31 is a screw-like operating shaft 33, one end of which is provided with a rectangularly-shaped raised portion 33a received in a slot 34a at one end of each of a pair of links 34. The links 34 interconnect the pair of operating shafts 33 with a pair of lever arms 35 by means of a pivot pin 36 which is carried at one end of each of the lever arms 35 and is received in an opening 34b provided therefor at the other end of each of the links 34. A notched portion 35a is provided at the other end of each of the lever arms 35 for a purpose to be described. Intermediate the ends of each of the lever arms 35 there is provided another pivot pin 37 having an enlarged head portion 37a which is slightly smaller in size than the enlarged openings 28b and 29b provided at one end of each of the slots 28 and 29 in the support member 27. Each of the pivot pins 37 slides within the respective narrow portion 28a and 29a of slots 28 and 29.

The threaded engagement of the shafts 33 and the bushings 30, 31 is of the "locking" type which resists movements due to vibration or due to reaction forces exerted by the lever arms 35. This may comprise a locking insert of plastic material in the bushings 30, 31 or simply an "interference fit" between the shafts 33, 33 and the bushings 30, 31. Still another alternative would use lock nuts threaded on shafts 33, 33 to lock against bushings 30, 31 after the connection is initially made.

To assemble the various members comprising the concealed front fastener 26, the head portion 37a of each of the pivot pins 37 is inserted into one of the enlarged openings 28b and 29b provided in the support member 27 and the pivot pin 37 is slid into the narrow portion 28a and 29a of the respective slot 28, 29. Then each of the pivot pins 36 is inserted into the respective openings 34b provided therefor in each of the links 34. An operating shaft 33 is thereafter threaded into each of the bushings 30, 31 until the raised portion 33a carried by each of the shafts 33 is positioned in the slot 34a provided therefor in each of the links 34.

With the lever arms 35 mounted on the support member 27 so that they are operatively interconnected with the shafts 33, the support member 27 may be readily assembled to the carriage member 38. This is accomplished by inserting the bent tabs 27a provided in the support member 27 along one edge thereof into openings 38a suitably provided therefor at corresponding spaced intervals in the carriage member 38. The support member 27 is then fixedly secured to the carriage member 38 by suitable means such as for example by means of a plurality of studs 39 received in openings 27b provided therefor in the support member 27.

A cut-out 38b is provided centrally located in the carriage member 38 in juxtaposed relation to the bushings 30 and 31 for the purpose of providing access to the operating shafts 33 threaded into the bushings 30 and 31. In the preferred embodiment the carriage member 38 which is in the form of an angle-shaped member constitutes an integral part of the member 40 which is suitably secured such as by welding, etc. to the inner surface of the front 17 adjacent the opening therein which is capable of being closed by the door 18. The member 40 is intended to provide additional support to the center portion of the front 17. Also, in accordance with the preferred embodiment of the invention, a concealed front fastener 26 would be utilized at both the top and the bottom of the front 17 as viewed with reference to FIGURES 1 and 2 of the drawings.

Figure 4:
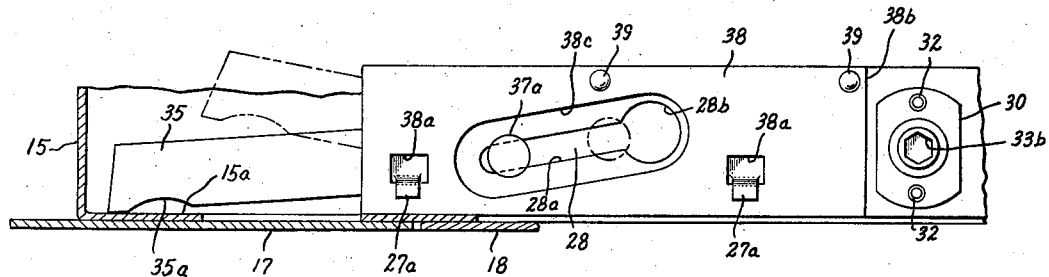
FIGURE 4 is a fragmentary sectional view on enlarged scale of a concealed front fastener in accordance with the present invention.

It will further be noted that as shown in FIGURE 4 of the drawings the carriage member 38 is also provided with a pair of enlarged slots 38c (only one shown) each of which is intended to overlie one of the elongated slots 28 suitably provided in support member 27. With the support member 27 mounted on the carriage member 38, the slots 38c provide freedom of movement for the enlarged head portion 37a of the respective pivot pin 37. As noted earlier, pivot pins 37 slide in the corresponding slots 28, 29 when the lever arms 35 are caused to move between clamping and unclamping positions.

Figure 3:
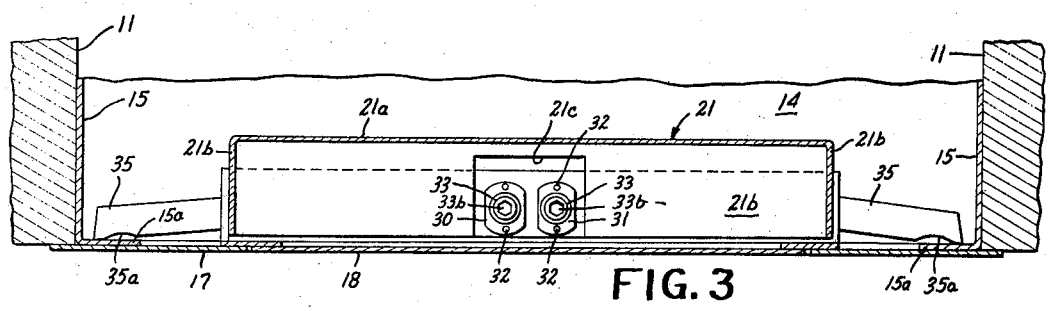
FIGURE 3 is a cross-sectional view of the electrical panelboard of FIGURE 1 taken substantially on the line of section 3—3 of FIGURE 1.

For purposes of mounting the front 17 on the box 12, the lever arms 35 are first positioned as shown in solid lines in FIGURE 5. Then the front 17 is brought into juxtaposed relation to the side wall flange portions 14a and 15a. With the door 18 open, access is provided to the operating shafts 33 which may be rotated by a suitable means, such as a wrench 41, in the direction of arrows 42, and 43, the latter being illustrated in FIGURE 5. As shown in FIGURE 3, the operating shafts 33 are each provided with a recessed head 33b capable of receiving the wrench 41.

It will be noted that the shield 21 is also provided with cut-outs 21c similar to the cut-out 38b in the carriage member 38 thereby enabling access to be gained to the operating shafts 33. A tool rotation of approximately 120° in the direction of arrows 42 and 43 brings the notched portions 35a of the lever arms 35 into engagement with the inner surface of the side wall flange portions 15a and 15a, whereby the latter are captured between the lever arms 35 and the inner surface of the trim 17. Inasmuch as the operating shafts 33 are operated independently of each other it is possible to individually adjust the lever arms 35 relative to the side wall flange portions 15a and 15a thereby ensuring that the front 17 is securely attached to the box 12. Thus, with the front 17 so mounted and with the door 18 in the trim closed and locked by operation of the locking means 20, it is not possible for someone to gain unauthorized access to the electrical equipment housed within the interior of the panelboard 10.

To detach the front 17 from the box 12, the door 18 is first unlocked and then opened whereby access is provided to the operating shafts 33 as set forth hereinabove. By rotating the shafts 33 in the opposite direction from that depicted by the arrows 42 and 43 in FIGURE 5, the notched portions 35a of lever arms 35 are backed away from engagement with the respective side wall flange portions 15a and 15a until the lever arms 35 again occupy the position illustrated in solid lines in FIGURE 5. The front 17 is then freely removable from the box 12.

Figure 7:
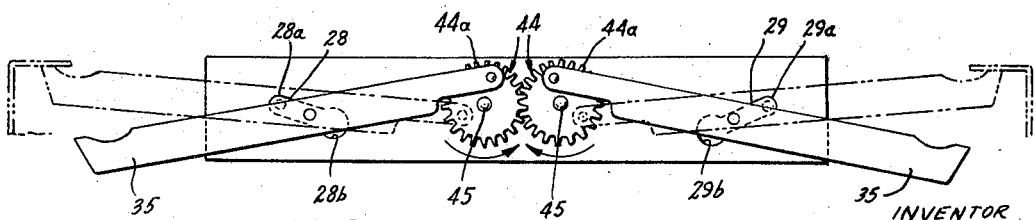
FIGURE 7 is an elevation view of another embodiment of concealed front fastener in accordance with the present invention.

In accordance with the embodiment of the invention illustrated in FIGURE 7 of the drawings, the operating shafts 33 have been replaced by a pair of gears 44 suitably mounted on shafts 45, the latter being supported in rotatable self-locking relation in bushings (not shown) similar to the bushings 30 and 31 described previously in connection with the embodiment of the invention illustrated in FIGURES 3–6 of the drawings. The teeth 44a of the gears 44 are inter meshing such that rotation of either of the shafts 45 by means of a suitable tool (not shown) results in the simultaneous movement of the lever arms 35 between a clamping position wherein the end portion of the lever arms 35 are in engagement with the inner surface of the side wall flange portions 15a and 15a, respectively, and an unclamping position wherein the end portion of the lever arms 35 are out of engagement with the aforesaid side wall flange portions. In all other respects, the embodiment of the invention illustrated in FIGURE 7 is the same as that shown in FIGURES 3–6 of the drawings.

While two particular embodiments of my invention have been shown, it will be appreciated that many modifications thereof may readily be made by those skilled in the art.

What I claim as new and desire to secure by Letters Patent of the United States is:

1. An electrical panelboard comprising:
   (a) a box enclosure having a back wall, a plurality of side walls, and an open front wall;
   (b) at least one of said side walls having a flange portion extending inwardly of said enclosure;
   (c) front closure means closing said open front wall of said box enclosure comprising a generally planar front cover having a door therein, said front cover having an inner surface and an outer surface and a flange extending generally perpendicular to the plane of said front cover;
   (d) at least one concealed fastener detachably attaching said front cover to said flange portion of said side wall of said box enclosure with said cover flange adjacent said side wall flange;
   (e) said concealed fastener comprising a lever arm, means pivotally mounting said lever arm on said cover flange for movement between a clamping and an unclamping position relative to said flange portion of said side wall of said box enclosure;
   (f) an operating member mounted on said front cover for rotation relative thereto, means operatively interconnecting one end of said lever arm to said operating member;
   (g) means carried by said operating member for facilitating rotation of said operating member to cause said lever arm to move between a clamping position wherein said lever arm is in engagement with said flange portion of said side walls of said box enclosure and an unclamping position wherein said lever arm is out of engagement with said flange portion; and
   (h) said operating member being accessible for operation from outside said enclosure when said door is open and being inaccessible from outside said enclosure when said door is closed.

2. An electrical panelboard comprising:
   (a) a box enclosure having a back wall, a plurality of side walls, and an open front wall;
   (b) at least one of said side walls having a flange portion extending inwardly of said enclosure;
   (c) a front closure means closing said open front wall of said box enclosure comprising a generally planar front cover having a door therein, said front cover having an inner surface and an outer surface and a flange extending generally perpendicular to the plane of said front cover;
   (d) a plurality of concealed fasteners for detachably attaching said front cover to said flange portion of said side wall of said box enclosure with said cover flange adjacent said side wall flange;
   (e) each of said plurality of concealed fasteners comprising a lever arm, means pivotally mounting said lever arm on said cover flange for movement between a clamping an an unclamping position relative to said flange portion of said side wall of said box enclosure, a pair of operating members mounted on said front cover for rotation relative thereto, means operatively interconnecting one end of each of said pair of lever arms to a corresponding one of said pair of operating members;
   (f) means carried at one end of each of said pair of operating members to cause said lever arms to move between a clamping position wherein said lever arm is in engagement with said flange portion of said side walls of said box enclosure and an unclamping position wherein said lever arm is out of engagement with said flange portion; and
   (g) said operating members being accessible for operation from outside said enclosure when said door is open and being inaccessible from outside said enclosure when said door is closed.

3. An electrical panelboard as set forth in claim 2 wherein:
   (a) said means fixedly supporting said support member comprises an angle-shaped carriage member fixedly attached to said inner surface of said trim;
   (b) said means pivotally mounting said pair of lever arms comprises a first pair of pivot pins;
   (c) said pair of operating members comprises a pair of operating shafts rotatable independently of each other; and
   (d) said means operatively interconnecting said one end of each of said pair of lever arms comprises a second pair of pivot pins.

4. An electrical panelboard as set forth in claim 2 wherein:
   (a) said means fixedly supporting said support member comprises an angle-shaped carriage member fixedly attached to said inner surface of said trim;
   (b) said means pivotally mounting said pair of lever arms comprises a first pair of pivot pins;
   (c) said pair of operating members comprises a pair of gears having intermeshing teeth to cause both of said pair of gears to rotate simultaneously; and
   (d) said means operatively interconnecting said one end of each of said pair of lever arms comprises a second pair of pivot pins.

5. A concealed front fastener for attaching the front of an electrical panelboard to the box enclosure thereof having a plurality of side walls, and an open front wall, said front being generally planar and having a door therein, said concealed front fastener comprising:
   (a) means fixedly supporting said fastener on said front adjacent said door therein;
   (b) a pair of lever arms;
   (c) means pivotally mounting said pair of lever arms on said means fixedly supporting for movement between a clamping and an unclamping position relative to said box enclosure;
   (d) a pair of operating members mounted on said means for fixedly supporting for rotation relative thereto;
   (e) means operatively interconnecting one end of each of said lever arms to a corresponding one of said pair of operating members;
   (f) means carried by said operating members for facilitating rotation of said operating members to cause said lever arms to move between said clamping position wherein said lever arms are in engagement with said box enclosure and an unclamping position wherein said lever arms are out of engagement with said flange portions; and (g) said operating members being accessible for operation from outside said enclosure when said door is open and being inaccessible from outside said enclosure when said door is closed.

6. A concealed front fastener as set forth in claim 5 wherein:
(a) said means fixedly supporting said fastener comprises an angle-shaped carriage member fixedly attached to said front;
(b) said means pivotally mounting said pair of lever arms comprises a first pair of pivot pins;
(c) said pair of operating members comprises a pair of operating shafts rotatable independently of each other; and
(d) said means operatively interconnecting said one end of each of said pair of lever arms comprises a second pair of pivot pins.

7. A concealed trim fastener as set forth in claim 5 wherein:
(a) said means fixedly supporting said support means comprises an angle-shaped carriage member fixedly attached to said trim;
(b) said means pivotally mounting said pair of lever arms comprises a first pair of pivot pins;
(c) said pair of operating members comprises a pair of gears having intermeshing teeth to cause both of said pair of gears to rotate simultaneously; and
(d) said means operatively interconnecting said one end of each of said pair of lever arms comprises a second pair of pivot pins.

References Cited

UNITED STATES PATENTS

| | | | |
|---|---|---|---|
| 2,612,283 | 9/1952 | Cole | 220—3.6 |
| 2,878,955 | 3/1959 | Hagan | 220—3.9 |
| 3,276,834 | 10/1966 | Greenwald et al. | 312—242 |

CASMIR A. NUNBERG, Primary Examiner

U.S. Cl. X.R.

220—3.6